United States Patent [19]

Iwamoto et al.

[11] Patent Number: 4,566,647
[45] Date of Patent: Jan. 28, 1986

[54] DECORATIVE WINDING METHOD FOR MAGNETIC TAPE OR THE LIKE

[75] Inventors: Shoji Iwamoto; Kazuo Kubota, both of Odawara, Japan

[73] Assignee: Fuji Photo Film Co., Ltd., Tokyo, Japan

[21] Appl. No.: 633,335

[22] Filed: Jul. 23, 1984

[30] Foreign Application Priority Data

Jul. 26, 1983 [JP] Japan .................. 58-136643

[51] Int. Cl.⁴ ............................................ B65H 17/02
[52] U.S. Cl. .................. 242/67.1 R; 242/71.9
[58] Field of Search .............. 242/67.1 R, 105, 71.9, 242/73, 76, 71.8, 67.2–67.5

[56] References Cited

U.S. PATENT DOCUMENTS

| | | | |
|---|---|---|---|
| 3,295,778 | 1/1967 | Fiorentino et al. | 242/71.9 X |
| 3,706,488 | 12/1972 | Masetta | 242/71.9 X |
| 4,009,842 | 3/1977 | Persha et al. | 242/71.9 |
| 4,117,988 | 10/1978 | Moore | 242/71.8 X |
| 4,226,381 | 10/1980 | Katata | 242/71.8 |

Primary Examiner—John M. Jillons
Attorney, Agent, or Firm—Pasquale A. Razzano

[57] ABSTRACT

In a decorative winding method for a magnetic tape or the like, a tape reel comprising a lower flange and a reel shaft one end of which is secured to the lower flange is supported with the other end of the reel shaft facing up. One end of a tape is clamped to the reel shaft, and the tape is wound up on the reel shaft while the tape is pushed onto the lower flange side by the weight of a cap placed on the upper side edge of the tape. An upper flange is then secured to the other end of the reel shaft, thereby obtaining the tape reel with the tape wound up in an aligned winding appearance.

4 Claims, 3 Drawing Figures

DECORATIVE WINDING METHOD FOR MAGNETIC TAPE OR THE LIKE

BACKGROUND OF THE INVENTION

1. Field of the Invention

This invention relates to a decorative winding method for winding up a thin tape such as a magnetic tape in an aligned winding appearance on a tape reel.

2. Description of the Prior Art

For example, in video tape cassettes wherein a part of the cassette half and the tape reel are fabricated of transparent members so that the winding condition of a magnetic tape wound on the tape reel is visible, it is desired to improve the commercial value of the video tape cassettes by aligning the side edges of the turns of the magnetic tape wound on the tape reel. In general, as the tape reels of the video tape cassettes or the like, flanged reels comprising a hub and flanges secured to the ends of the hub are used. However, an aligned winding appearance cannot be obtained when the magnetic tape is merely wound on the flanged reels.

Therefore, various decorative winding methods for winding a thin tape such as a magnetic tape in an aligned winding appearance on a tape reel have heretofore been proposed. For example, as disclosed in Japanese Unexamined Utility Model Publication No. 52(1977)-145815, it has been proposed to wind up a tape by contacting a touch roller with the tape. However, when the touch roller is used, the tape is readily scratched by the touch roller, and fluctuation in tension readily arises in the tape during winding up. Further, Japanese Unexamined Utility Model Publication No. 51(1976)-19378 discloses a method of winding up a tape by inserting a plate-like tape guide between a flange of a tape reel and the side edge of the tape. In this method, however, the flange or the tape is damaged by the tape guide. It is also known to wind up a tape by interleaving nonwoven paper between a flange of a tape reel and the side edge of the tape. However, this method is disadvantageous in that it is not always possible to achieve automatic tape winding and dust is produced by the nonwoven paper.

SUMMARY OF THE INVENTION

The primary object of the present invention is to provide a decorative winding method for a magnetic tape or the like, wherein a thin tape is wound up in an aligned winding appearance on a flanged tape reel.

Another object of the present invention is to provide a decorative winding method for a magnetic tape or the like, wherein a thin tape is wound up without being damaged on the tape surface.

The specific object of the present invention is to provide a decorative winding method for a magnetic tape or the like, wherein a thin tape is wound up at a consistent, low tension.

The decorative winding method for a magnetic tape or the like in accordance with the present invention comprises the steps of:

(i) supporting a tape reel comprising a lower flange and a reel shaft one end of which is secured to said lower flange so that the other end of said reel shaft faces up, (ii) clamping one end of a tape to said reel shaft and winding up said tape on said reel shaft while said tape is pushed onto the lower flange side by the weight of a cap placed on the upper side edge of said tape, and (iii) thereafter securing an upper flange to said other end of said reel shaft.

In the present invention, since the tape is wound up on the reel shaft while the tape is pushed onto the lower flange side, it is possible to wind up the tape so that the side edges of the respective turns on the reel shaft are aligned with each other on the lower flange side and on the upper flange side. Further, since no member is contacted with the surface of the tape, the tape surface is not scratched. Also, the tension of the tape does not fluctuate during the wind-up step, and it is possible to wind up the tape at a low tension.

DESCRIPTION OF THE PREFERRED EMBODIMENT

The present invention will hereinbelow be described in further detail with reference to the accompanying drawings.

Figure 1:
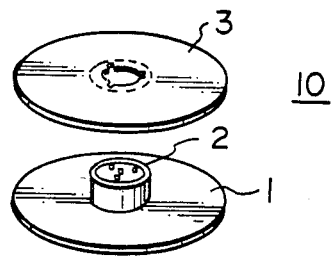
FIG. 1 is a perspective view showing the tape reel on which the tape is wound up by an embodiment of the decorative winding method in accordance with the present invention.

FIG. 1 shows a tape reel 10 on which a tape is wound up by an embodiment of the decorative winding method in accordance with the present invention. By way of example, the tape reel 10 is a one for a video tape cassette. A lower flange 1 and a reel shaft (hub) 2 of the tape reel 10 are fabricated integrally. An upper flange 3 is fabricated separately from the reel shaft 2.

Figure 2:
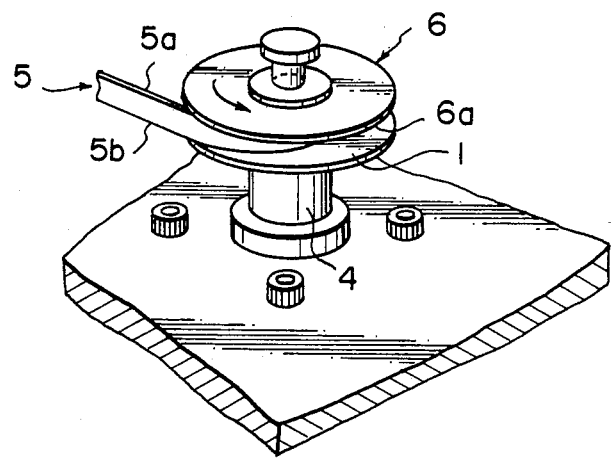
FIGS. 2 and 3 are perspective views showing the steps of the embodiment of the decorative winding method in accordance with the present invention.

As shown in FIG. 2, the lower flange 1 and the reel shaft 2 of the tape reel 10 are mounted on a rotatable winding shaft 4 with the free end of the reel shaft 2 facing up. The end of a magnetic tape 5 is clamped to the reel shaft 2, and a disk-like cap 6 is placed on the reel shaft 2. The cap 6 is loosely fitted on the circumferential portion of the end of the reel shaft 2. Or, the cap 6 may be provided with a protrusion, and the reel shaft 2 may be provided with a center hole in the end face. In this case, the cap 6 is supported on the reel shaft 2 by loosely fitting the protrusion of the cap 6 into the center hole of the reel shaft 2. Thus a bottom face 6a of the cap 6 is pushed into contact with an upper side edge 5a of the magnetic tape 5 by the weight of the cap 6.

When the winding shaft 4 is rotated in this condition, the reel shaft 2 is rotated together with the lower flange 1, and the magnetic tape 5 is wound up on the reel shaft 2. At this time, since the upper side edge 5a of the magnetic tape 5 is pushed by the cap 6 and the magnetic tape 5 is shifted to the lower flange side, the upper side edge 5a of the magnetic tape 5 is maintained at a predetermined height during the winding step. Since the magnetic tape 5 has a predetermined width over the entire length thereof, a lower side edge 5b of the magnetic tape 5 is also maintained at a predetermined height during the winding step. Accordingly, the magnetic tape 5 is wound up on the reel shaft 2 in an aligned winding appearance.

Figure 3:
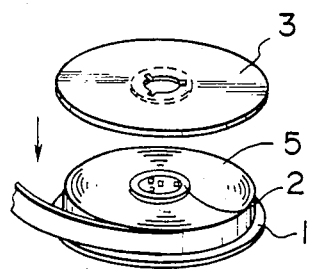

A predetermined length of the magnetic tape 5 is wound up on the reel shaft 2 as described above. As shown in FIG. 3, the upper flange 3 is thereafter secured to the end of the reel shaft 2, and the tape reel 10 with the magnetic tape 5 wound up thereon is completed. Fixing of the upper flange 3 to the reel shaft 2 is conducted by use of a known technique such as caulking or snapping.

To achieve smooth tape winding, the bottom face 6a of the cap 6 contacted with the upper side edge 5a of the magnetic tape 5 should preferably be finished to high flatness.

We claim:

1. A decorative winding method for winding a magnetic tape or the like onto a reel having a lower flange and an integral reel shaft having a free end onto which a transparent flange is secured after the magnetic tape or the like has been wound onto the reel shaft, the method resulting in a flat, even coil of said tape or the like having an attractive, even appearance, the method comprising the steps of:

(i) supporting said lower flange and said reel shaft so that said free end of said reel shaft faces upwards;
(ii) clamping one end of the tape to said reel shaft;
(iii) placing a weighted disc-like cap on the free end of the reel shaft;
(iv) winding up said tape on said reel shaft while said tape is biased downward against the lower flange by the weight of said cap;
(v) removing said cap; and
(vi) thereafter securing said upper flange to said free end of said reel shaft to complete the tape reel.

2. A method as defined in claim 1 wherein said cap is loosely fitted on the circumferential portion of said free end of said reel shaft.

3. A method as defined in claim 1 wherein said reel shaft is provided with a center hole at said free end, said cap is provided with a protrusion, said protrusion of said cap being loosely fitted into said center hole of said reel shaft.

4. A method as defined in claim 1 wherein a bottom face of said cap contacted with said upper side edge of said tape is finished to high flatness.

* * * * *